US011500241B2

(12) United States Patent
Chen et al.

(10) Patent No.: US 11,500,241 B2
(45) Date of Patent: Nov. 15, 2022

(54) POLARIZER, DISPLAY PANEL, AND METHOD FOR MANUFACTURING DISPLAY PANEL

(71) Applicants: Kunshan New Flat Panel Display Technology Center Co., Ltd., Suzhou (CN); KunShan Go-Visionox Opto-Electronics Co., Ltd., Suzhou (CN)

(72) Inventors: Lingyan Chen, Suzhou (CN); Lingxiao Du, Suzhou (CN)

(73) Assignees: Kunshan New Flat Panel Display Technology Center Co., Ltd., Kunshan (CN); KunShan Go-Visionox Opto-Electronics Co., Ltd., Kunshan (CN)

( * ) Notice: Subject to any disclaimer, the term of this patent is extended or adjusted under 35 U.S.C. 154(b) by 0 days.

(21) Appl. No.: 17/365,202

(22) Filed: Jul. 1, 2021

(65) Prior Publication Data

US 2021/0325726 A1    Oct. 21, 2021

Related U.S. Application Data (63) Continuation of application No. PCT/CN2020/072527, filed on Jan. 16, 2020.

(30) Foreign Application Priority Data

Jun. 27, 2019   (CN) .......................... 201910568009.5

(51) Int. Cl.
*G02F 1/1335*   (2006.01)
*G02F 1/1337*   (2006.01)
(Continued)

(52) U.S. Cl.
CPC .. *G02F 1/133531* (2021.01); *G02F 1/133711* (2013.01); *G02F 1/134309* (2013.01); *G09G 3/3611* (2013.01)

(58) Field of Classification Search
None
See application file for complete search history.

(56) References Cited

U.S. PATENT DOCUMENTS

| 5,132,815 A   | * | 7/1992 | Fergason ............ G02F 1/13725 349/86 |
| 2002/0000960 A1 | * | 1/2002 | Yoshihara ............ G09G 3/3651 345/87 |

(Continued)

FOREIGN PATENT DOCUMENTS

| CN | 1846155 A   | 10/2006 |
| CN | 101578552 A | 11/2009 |

(Continued)

OTHER PUBLICATIONS

Chinese First Office Action for corresponding Chinese Application Application No. 201910568009.5 dated Mar. 31, 2020., 27 pgs.

(Continued)

*Primary Examiner* — Ryan Crockett
(74) *Attorney, Agent, or Firm* — Maier & Maier, PLLC (57) ABSTRACT

A polarizer, a display panel and a method for manufacturing the display panel are disclosed. The polarizer may include a first liquid crystal layer and a second liquid crystal layer. The second liquid crystal layer may be formed on the first liquid crystal layer and stacked on the first crystal layer. A polarity of first liquid crystal molecules in the first liquid crystal layer may be smaller than a polarity of first liquid crystal molecules in a natural state.

18 Claims, 4 Drawing Sheets

(51) Int. Cl.
*G02F 1/1343* (2006.01)
*G09G 3/36* (2006.01)

(56) References Cited

U.S. PATENT DOCUMENTS

| | | |
|---|---|---|
| 2005/0024562 A1 | 2/2005 | Hoff et al. |
| 2007/0177084 A1 | 8/2007 | Ishitani et al. |
| 2011/0051034 A1 | 3/2011 | Egi et al. |
| 2019/0235148 A1* | 8/2019 | Hasegawa ............ G02B 5/3083 |

FOREIGN PATENT DOCUMENTS

| | | |
|---|---|---|
| CN | 103135157 A | 6/2013 |
| CN | 105295955 A | 2/2016 |
| CN | 106199812 A | 12/2016 |
| CN | 108663851 A | 10/2018 |
| CN | 109564314 A | 4/2019 |
| CN | 110275239 A | 9/2019 |
| JP | 4733786 B2 | 7/2011 |
| TW | 200736050 A | 10/2007 |
| TW | 201508351 A | 3/2015 |
| TW | 201807174 A | 3/2018 |

OTHER PUBLICATIONS

International search report for corresponding Application No. PCT/CN2020/072527 dated Apr. 9, 2020., 12 pgs.
Notification to Grant Patent Right for Invention for corresponding Chinese Application No. 201910568009.5 dated Feb. 2, 2021., 6 pgs.
"Application of UV absorber in TAC film of polarizer", Published in Dec. 31, 2013, 12 pgs.
"Texture analysis of optical properties of liquid crystal in LCD", Journal of Shantou University (Natural Science), Published in Nov. 30, 2005, 10 pgs.
Notice of examination opinions for corresponding Taiwanese Application No. 109101233 dated Aug. 5, 2020., 8 ogs.

* cited by examiner

POLARIZER, DISPLAY PANEL, AND METHOD FOR MANUFACTURING DISPLAY PANEL

CROSS-REFERENCE TO RELATED APPLICATIONS

The present application is a continuation application of International (PCT) Patent Application No. PCT/CN2020/072527 filed Jan. 16, 2020, which claims foreign priority of Chinese Patent Application No. 201910568009.5, filed on Jun. 27, 2019, the entire contents of which are hereby incorporated by reference in their entireties.

TECHNICAL FIELD

The described embodiments relate to a field of display technology, and in particular to a polarizer, a display panel, and a method for manufacturing the display panel.

BACKGROUND

At present, a thickness of a polarizer is getting smaller and smaller according to market demand A major breakthrough is the transformation of the phase difference film in the polarizer from the traditional stretching type to the liquid crystal coating type, so that the thickness of the polarizer can be reduced from tens of microns to several microns.

In order to ensure the good optical performance of the polarizer, the phase difference film is generally a combination of ¼ phase difference film and ½ phase difference film. However, since liquid crystal molecules generally have polarities, the liquid crystal molecules will affect angles of liquid crystal molecules in another layer, thereby affecting the optical performance of the polarizer.

SUMMARY

A polarizer, a display panel, and a method for manufacturing the display panel are provided in the present disclosure to reduce the influence of a first liquid crystal layer on a second liquid crystal layer in the polarizer.

One technical solution the present disclosure adopts is providing a polarizer. The polarizer may include a first liquid crystal layer and a second liquid crystal layer. The second liquid crystal layer may be formed on the first liquid crystal layer and stacked on the first liquid crystal layer. A polarity of first liquid crystal molecules in the first liquid crystal layer may be smaller than a polarity of first liquid crystal molecules in a natural state.

Another technical solution the present disclosure adopts is providing a display panel. The display panel may include the polarizer as described above.

Another technical solution the present disclosure adopts is: providing a method for manufacturing the display panel as described above. The method may include: coating first liquid crystal molecules, wherein the first liquid crystal molecules are in a natural state currently; reducing or eliminating a polarity of the first liquid crystal molecules; curing the first liquid crystal molecules with the polarity reduced or eliminated to form a first liquid crystal layer to make the polarity of the first liquid crystal molecules in the first liquid crystal layer smaller than its polarity in the natural state; coating second liquid crystal molecules on a side of the first liquid crystal layer; curing the second liquid crystal molecules to form a second liquid crystal layer.

DETAILED DESCRIPTION

The technical solutions in the embodiments of the present disclosure will be clearly and completely described in connection with the drawings of the embodiments of the present disclosure. Obviously, the described embodiments are merely parts of the embodiments of the present disclosure, not all embodiments. Based on the embodiments in the present disclosure, all other embodiments can be obtained by those skilled in the art without any creative work are within the scope of the protection of the present disclosure.

Figure 1:
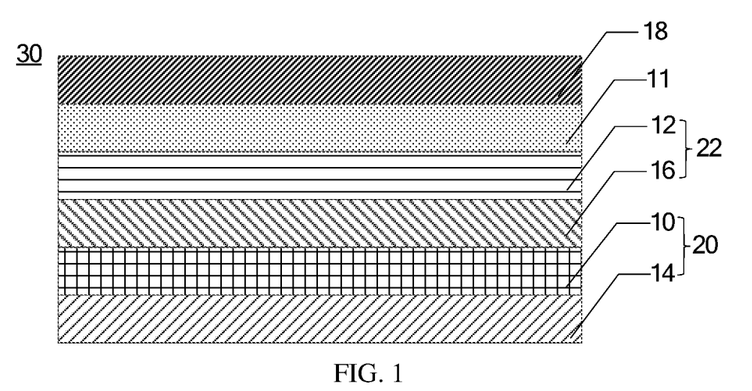
FIG. 1 is a structural view of a polarizer according to an embodiment of the present disclosure.

FIG. 1 is a structural view of a polarizer according to an embodiment of the present disclosure. As shown in FIG. 1, the polarizer 30 may include a first liquid crystal layer 10 and a second liquid crystal layer 12 arranged in a stacked manner. The first liquid crystal layer 10 may be formed before the second liquid crystal layer 12 to form the second liquid crystal layer 12 on the first liquid crystal layer 11. A polarity of first liquid crystal molecules in the first liquid crystal layer 10 may be smaller than a polarity of the first liquid crystal molecules in a natural state. The natural state is a state in which the first liquid crystal molecules can be stored naturally without any external electric field force.

In some embodiments of the present disclosure, the first liquid crystal molecules may have a first polarity in the natural state. The first liquid crystal molecules of the first liquid crystal layer 10 may have a second polarity. The second polarity can be smaller than the first polarity. When the second liquid crystal layer 12 is formed on the first liquid crystal layer 10 subsequently, since the polarity of the first liquid crystal molecules in the first liquid crystal layer 10 has been reduced, an interaction force between the first liquid crystal molecules and second liquid crystal molecules in the second liquid crystal layer 12 can be weakened, thereby reducing or eliminating the influence on angles of the second liquid crystal molecules in the second liquid crystal layer 12, and increasing an effect of optical display.

The types of the first liquid crystal molecules and the second liquid crystal molecules can be any one in the related art, which will not be described in detail herein.

In an embodiment, the polarity of the first liquid crystal molecules in the first liquid crystal layer 10 is substantially 0. In other words, when the first liquid crystal layer 10 is formed, the first liquid crystal molecules can be transformed from polar molecules in the natural state to non-polar molecules. In this way, the influence of the first liquid crystal layer 10 on the angles of the second liquid crystal molecules in the second liquid crystal layer 12 can be reduced to a minimum.

In another embodiment, with continued reference to FIG. 1, the polarizer 30 provided in the present disclosure may further include a first alignment layer 14 and a second alignment layer 16. The first alignment layer 14 may be disposed at a side of the first liquid crystal layer 10 away from the second liquid crystal layer 12. The first alignment layer 14 can be directly contacting with the first liquid crystal layer 10 to cooperatively form a ¼ phase difference film 20. Material of the first alignment layer 14 can be any material in the related art, which will not be described in detail herein.

The arrangement of the first alignment layer 14 can facilitate the first liquid crystal molecules in the first liquid crystal layer 10 to be arranged along a first alignment direction. The second alignment layer 16 may be disposed between the first liquid crystal layer 10 and the second liquid crystal layer 12. The second alignment layer 16 can be directly contacting with the second liquid crystal layer 12 to cooperatively form a ½ phase difference film 22. Material of the second alignment layer 16 can be any material in the related art, which will not be described in detail herein. The arrangement of the second alignment layer 16 can facilitate the second liquid crystal molecules in the second liquid crystal layer 12 to be arranged along a second alignment direction.

In some embodiments of the present disclosure, a phase difference film of the polarizer 30 can be a combination of the ¼ phase difference film 20 and the ½ phase difference film 22. In this way, the polarizer 30 can have a good optical performance.

In another embodiment, with continued reference of FIG. 1, the polarizer 30 provided in the present disclosure may further include a linear polarization film 18 and an adhesive layer 11. The linear polarization film 18 can be located at a side of the ½ phase difference film 22 away from the ¼ phase difference film 20. The linear polarization film 18 can be a polyvinyl alcohol film in a stretching type. In order to reduce the probability of the linear polarization film 18 being eroded by external water vapor, protection layers, such as cellulose triacetate layers, may be provided on both sides of the linear polarization film 18. The adhesive layer 11 can be disposed between the linear polarization film 18 and the ½ phase difference film 22 and configured to bond the linear polarization film 18 with the ½ phase difference film 22. The adhesive layer 11 can be pressure-sensitive adhesive, optical cement, or the like.

In some embodiments of the present disclosure, the linear polarization film 18 can be bonded to the ½ phase difference film 22 through a bonding process, which can avoid the erosion to the linear polarization film 18 by the solvent (for example, cyclopentanone, etc.). in the process of forming the ½ phase difference film 22.

In addition, in other embodiments, the linear polarization film 18 may also be in a liquid crystal type. In this case, the linear polarization film 18 may be formed on the side of the ½ phase difference film 22 by coating. In order to reduce the influence on angles of third liquid crystal molecules in the linear polarization film 18, the second liquid crystal layer 12 in the ½ phase difference film 22 can be designed in a form similar to the first liquid crystal layer 10. In other words, a polarity of the second liquid crystal molecules in the second liquid crystal layer 12 may be smaller than the polarity of the second liquid crystal molecules in a natural state.

Figure 2:
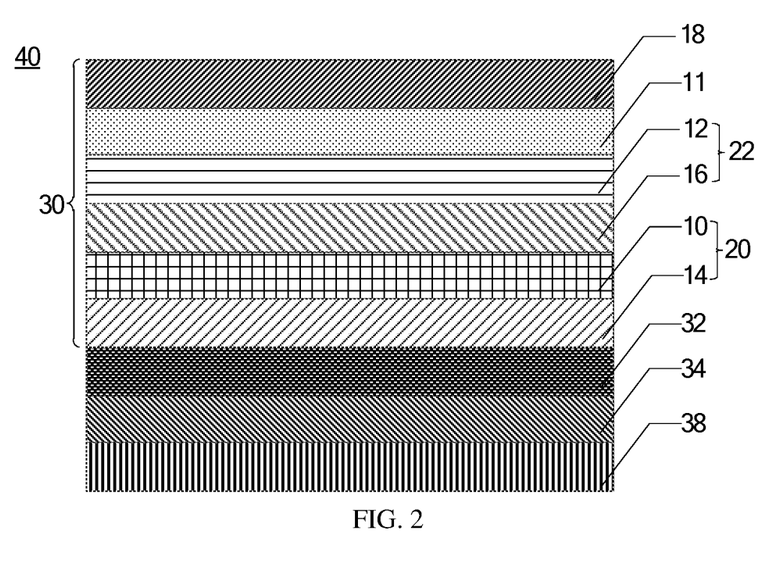
FIG. 2 is a structural view of a display panel according to an embodiment of the present disclosure.

FIG. 2 is a structural view of a display panel according to an embodiment of the present disclosure. Referring to FIG. 2, the display panel 40 can be an OLED (Organic Light-Emitting Diode) display panel, a Micro-OLED display panel, or the like. The display panel 40 can include the polarizer 30 in any embodiment described above.

In an embodiment, the display panel 40 can further include an encapsulation layer 32 and a planarization layer 34. The encapsulation layer 32 may be located at a side of the first liquid crystal layer 10 away from the second liquid crystal layer 12. The encapsulation layer 32 can be in a form of thin film encapsulation, glass powder encapsulation, or the like. The planarization layer 34 can be located between the encapsulation layer 32 and the first liquid crystal layer 10. For example, the planarization layer 34 can be located between the encapsulation layer 32 and the first alignment layer 14.

The material of the planarization layer 34 can be organic matter and the planarization layer 34 can have a certain thickness. When the first liquid crystal layer 10 and the second liquid crystal layer 12 are formed on a side of the planarization layer 34 by coating, the planarization layer 34 can reduce the erosion to the encapsulation layer 32 by the solvent (for example, cyclopentanone, etc.) used in processes of forming the first liquid crystal layer 10 and the second liquid crystal layer 12. In addition, the method of forming the first liquid crystal layer 10 and the second liquid crystal layer 12 on the planarization layer 34 by coating can reduce a thickness of the entire polarizer 30 in the display panel 40, thereby facilitating the bending of the polarizer 30 and the manufacturing of a flexible display panel.

Figure 3:
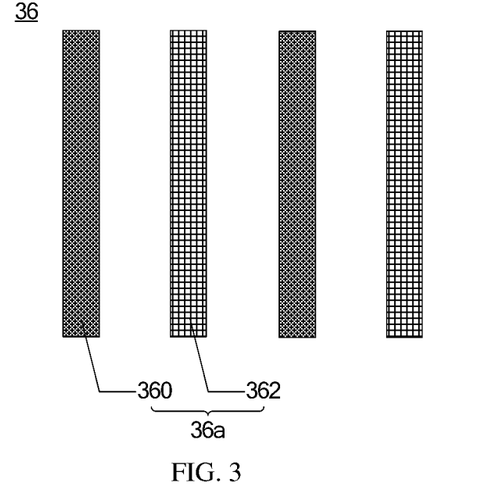
FIG. 3 is a structural view of a control circuit for controlling a polarity of liquid crystal according to an embodiment of the present disclosure.

FIG. 3 is a structural view of a control circuit of liquid crystal polarity according to an embodiment of the present disclosure. In another embodiment, as shown in FIG. 3, the display panel 40 provided in the present disclosure may further include a control circuit 36 for controlling a polarity of the first liquid crystal molecules. The control circuit 36 may include at least one electrode assembly 36a, and each electrode assembly 36a may include a first electrode 360 and a second electrode 362. The first electrode 360 may receive a positive voltage, and the second electrode 362 may receive a negative voltage. Alternatively, the first electrode 360 can receive the negative voltage, and the second electrode 362 can receive the positive voltage. It can be selected in accordance with specific conditions. A preset voltage difference can be generated between the first electrode 360 and the second electrode 362. The preset voltage difference can reduce or eliminate the polarity of the first liquid crystal molecules in the first liquid crystal layer 10.

For example, when eliminating or reducing a polarity of a certain type of first liquid crystal molecules needs a voltage greater than 3V, the preset voltage difference between the first electrode 360 and the second electrode 362 can be preset to be greater than or equal to 3V. Of course, the preset voltage difference cannot be too large. The maximum value of the preset voltage difference may be less than the minimum deflection voltage at which the direction of the first liquid crystal molecules can start to twist. In this way, it can be ensured that the polarity of the first liquid crystal molecules can be reduced without affecting the alignment of the first liquid crystal molecules. The design of the control circuit 36 has a simple structure and is easy to implement.

The principle of the control circuit 36 reducing or eliminating the polarity of the first liquid crystal molecules is as follows. In the natural state, the first liquid crystal molecules are polar molecules. When subjected to an electric field force generated by the control circuit 36, a displacement polarization of an electron cloud outside the first liquid crystal molecules will occur, and an induced polar pitch may be generated. The greater the preset voltage difference, the greater the induced pole pitch. When the induced pole pitch is opposite to an inherent pole pitch of a first liquid crystal molecule, the polarity of the first liquid crystal molecule will be reduced or even eliminated. When the first liquid crystal molecules are cured under light irradiation or heating, the first liquid crystal molecules can maintain a state of polarity reduced or even eliminated.

In actual operation, when the first liquid crystal molecules are coated on the first alignment layer 14, the first liquid crystal molecules can be arranged in the first alignment direction. The direction of the inherent polar pitch of the first liquid crystal molecules can be judged based on the arrangement and the molecular structure of the first liquid crystal molecules. The voltages accessed to the first electrode 360 and the second electrode 362 can be set according to the direction of the judged inherent pole pitch, so that the direction of the electric field formed by the first electrode 360 and the second electrode 362 is opposite to the direction of the inherent pole pitch, and the preset voltage difference is generated between the first electrode 360 and the second electrode 362.

In this embodiment, the first electrode 360 and the second electrode 362 can be located at a same layer, or can also be located at two or more different layers. The first electrode 360 and the second electrode 362 of at least one electrode assembly 36a can be arranged parallel to each other as shown in FIG. 3. When there are multiple electrode assemblies 36a, the first electrodes 360 and the second electrodes 362 of multiple electrode assemblies 36a can be alternately arranged in an order. The arrangement of the first electrode 360 and the second electrode 362 is relatively simple, and the electric field lines generated are relatively regular.

In addition, the first electrode 360 and/or the second electrode 362 may be shaped of a strip as shown in FIG. 3. The structure in this design is relatively simple, and the process is easy to realize. In one embodiment, an arrangement direction of the first electrode 360 and/or an arrangement direction of the second electrode 362 can be as parallel to the first alignment direction of the first alignment layer 14 as possible, so that the preset voltage difference actually required can be reduced to achieve the purpose of energy saving.

Figure 4:
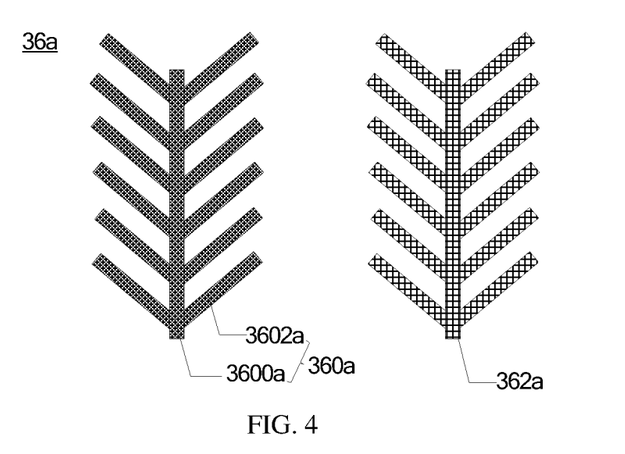
FIG. 4 is a structural view of a control circuit for controlling a polarity of liquid crystal according to another embodiment of the present disclosure.

Of course, in other embodiments, the structure of the first electrode 360 or the second electrode 362 can also be other. For example, as shown in FIG. 4, the first electrode 360a and/or the second electrode 362a can be shaped herringbone. Taking the first electrode 360a as an example, the first electrode 360a may include a middle part 3600a in a strip shape, and a plurality of extension parts 3602a extending from both sides of the middle part 3600a. An angle may be formed between each extension part 3602a and the middle part 3600a. The angle can be designed according to the alignment direction of the first alignment layer 14, so that the extension parts 3602a can be as parallel to the first alignment direction as possible, and thus the preset voltage difference actually required can be reduced to achieve the purpose of energy saving. Moreover, this design of the first electrode 360a or the second electrode 362a can make the space reasonably utilized.

Figure 5:
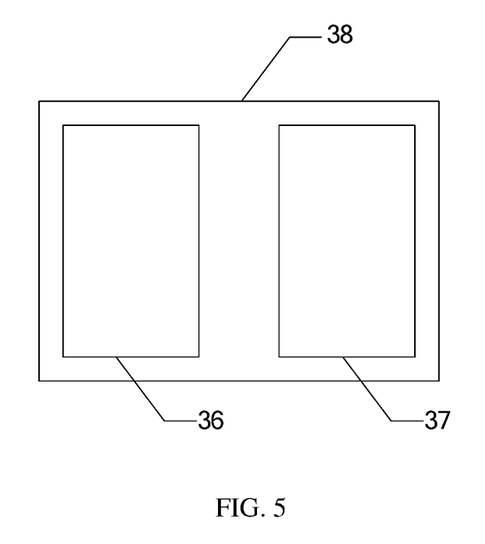
FIG. 5 is a structural view of an array substrate according to an embodiment of the present disclosure.

In addition, with continued reference to FIG. 2, the display panel 40 may further include an array substrate 38. For example, the array substrate 38 may be located at a side of the encapsulation layer 32 away from the planarization layer 34. As shown in FIG. 5, the array substrate 38 may include a pixel driving circuit 37. The pixel driving circuit 37 and the control circuit 36 may be independent from each other, and both can be located in the array substrate 38. The pixel driving circuit 37 may be configured to drive pixels to emit light. The control circuit 36 may be configured to generate the preset voltage difference.

Figure 6:
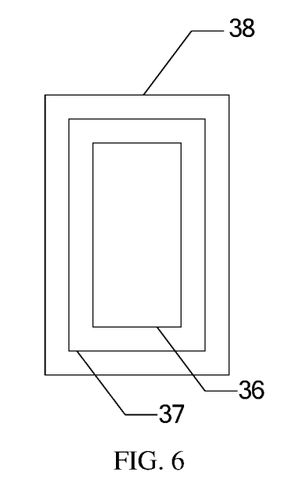
FIG. 6 is a structural view of an array substrate according to another embodiment of the present disclosure.

In the present embodiment, the pixel driving circuit 37 may include data lines, scan lines, gate lines, and so on. A width of the lines in the pixel driving circuit 37 can be reduced, so the vacated space can be used for the lines of the control circuit 36. Of course, in other embodiments, as shown in FIG. 6, the pixel driving circuit 37 may also include the control circuit 36. The pixel driving circuit 37 may be configured to drive the pixels to emit light and generate the preset voltage difference. In other words, the pixel driving circuit 37 can be designed to give the function of the control circuit 36 to partial electrodes in the original pixel driving circuit 37 configured to drive to emit light. The design of the control circuit 36 is simple in structure and easy to implement.

Of course, in other embodiments, the control circuit 36 described above can also be independent from the display panel 40 and located in other structures outside the display panel 40.

Figure 7:
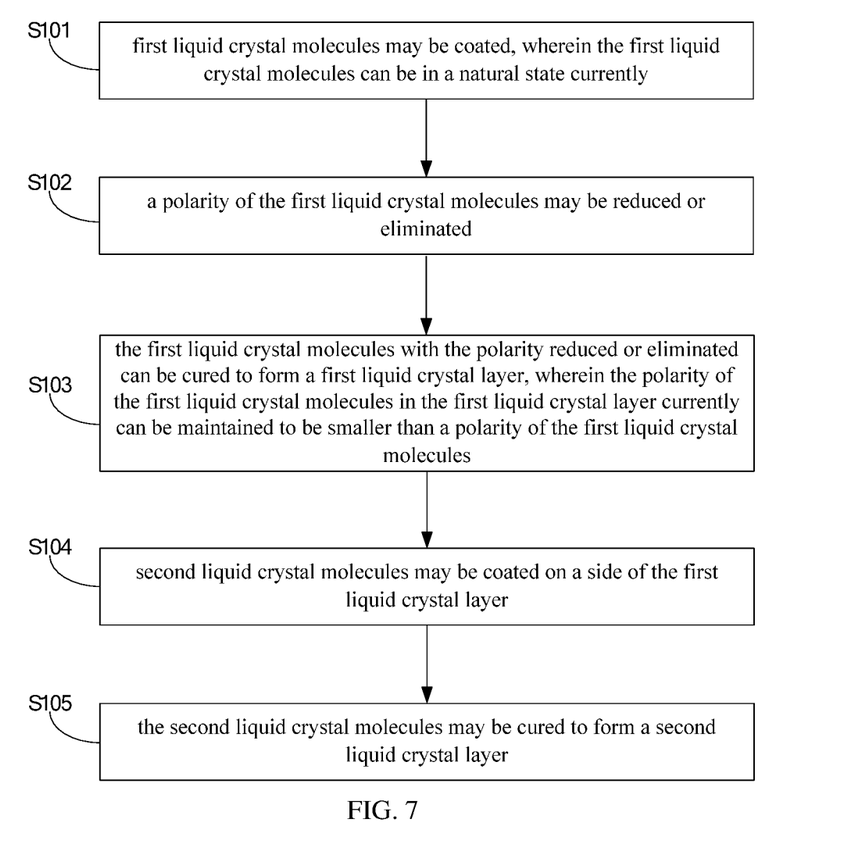
FIG. 7 is a flowchart illustrating a method for manufacturing the display panel.

FIG. 7 is a flowchart illustrating a method for manufacturing the display panel. Referring to FIGS. 2, 3 and 7 together, the method may include the following operations at blocks S101 to S105.

At block S101: first liquid crystal molecules may be coated, wherein the first liquid crystal molecules can be in a natural state currently.

Specifically, in one embodiment, before the block S101, the method provided in the present disclosure may further include: forming a planarization layer 34 on an encapsulation layer 32 of the display panel 40, and forming a first alignment layer 14 on the planarization layer 34. The first alignment layer 14 can be aligned by means of grating illumination or rubbing. In the above block S101, specifically, a layer of first liquid crystal molecules can be coated on the first alignment layer 14. The first liquid crystal molecules can be arranged along an alignment direction defined by the first alignment layer 14.

At block S102: a polarity of the first liquid crystal molecules may be reduced or eliminated.

Specifically, in one embodiment, a control circuit 36 in the display panel 40 may be used to implement the above block S102. For example, the first electrode 360 and the second electrode 362 in the control circuit 36 can generate a preset voltage difference. The polarity of the first liquid crystal molecules can be reduced or eliminated after the first liquid crystal molecule undergoes the preset voltage difference for a period of time. In this way, only the polarity of the first liquid crystal molecules can be affected by the control circuit 36, and an alignment direction of the first liquid crystal molecules may not be affected.

At block S103: the first liquid crystal molecules with the polarity reduced or eliminated can be cured to form a first liquid crystal layer 10. In some embodiments, the polarity of the first liquid crystal molecules in the first liquid crystal layer 10 currently can be maintained to be smaller than the polarity of the first liquid crystal molecules in the natural state.

Specifically, the first liquid crystal molecules can be cured to form the first liquid crystal layer 10 by means of illumination or heating. So far, the polarity of the first liquid crystal molecules in the first liquid crystal layer 10 can be fixed and maintained.

At block S104: second liquid crystal molecules may be coated on a side of the first liquid crystal layer 10.

In detail, before the block S104, the method provided in some embodiments of the present disclosure may further include forming a second alignment layer 16 on a side of the first liquid crystal layer 10 by coating. The second alignment layer 16 can be aligned by grating illumination or rubbing. The block S104 may specifically include: coating a layer of second liquid crystal molecules on a side of the second alignment layer 16. The second liquid crystal molecules can be arranged along an alignment direction defined by the second alignment layer 16.

At block S105: the second liquid crystal molecules may be cured to form a second liquid crystal layer 12.

Specifically, the curing operation can be performed under light or heating. In addition, after the block S105, the method provided in the present disclosure may further include attaching a linear polarization film 18 to the second liquid crystal layer 12 through an adhesive layer 11.

In the above embodiment, the polarizer 30 can be formed on the planarization layer 34 by coating. Of course, in other embodiments, the polarizer 30 can also be formed on a substrate by coating at first, and then attached to an encapsulation layer 32 of the display panel 40 by attaching or sticking. In this case, the planarization layer 34 can be omitted.

The above description is only some embodiments of the present disclosure, and it is not intended to limit the protection scope of the present disclosure. Any equivalent structure or equivalent process transformation made according to the contents of the specification and drawings of this disclosure, or a direct or indirect application of the above scheme in other related technical fields, are all considered to be included in the scope of patent protection of this disclosure.

What is claimed is:

1. A display panel, comprising:
a polarizer;
a control circuit for controlling a polarity of the first liquid crystal molecules, wherein the control circuit comprises at least one electrode assembly, wherein each of at least one electrode assembly comprises a first electrode and a second electrode, the first electrode and the second electrode are able to generate a preset voltage difference, the maximum value of the preset voltage difference is less than the minimum deflection voltage for twisting directions of the first liquid crystal molecules, and the preset voltage difference is capable of reducing or eliminating the polarity of the first liquid crystal molecules in the first liquid crystal layer,
wherein the polarizer comprises:
a first liquid crystal layer; and
a second liquid crystal layer, formed on the first liquid crystal layer and stacked on the first liquid crystal layer;
wherein a polarity of first liquid crystal molecules in the first liquid crystal layer is smaller than a polarity of first liquid crystal molecules in a natural state.

2. The display panel as claimed in claim 1, wherein the polarity of the first liquid crystal molecules in the first liquid crystal layer is zero.

3. The display panel as claimed in claim 1, wherein the polarizer further comprises:
a first alignment layer, disposed at a side of the first liquid crystal layer away from the second liquid crystal layer and directly contacting with the first liquid crystal layer to form a ¼ phase difference film; and
a second alignment layer, disposed between the first liquid crystal layer and the second liquid crystal layer and directly contacting with the second liquid crystal layer to form a ½ phase difference film.

4. The display panel as claimed in claim 3, wherein the polarizer further comprises:
a linear polarization film, located at a side of the ½ phase difference film away from the ¼ phase difference film; and
an adhesive layer, located between the linear polarization film and the ½ phase difference film and configured to bond the linear polarization film with the ½ phase difference film.

5. The display panel as claimed in claim 4, wherein the linear polarization film is in a liquid crystal type, and a polarity of second liquid crystal molecules in the second liquid crystal layer is smaller than a polarity of the second liquid crystal molecules in a natural state.

6. The display panel as claimed in claim 1, further comprising:
an encapsulation layer, located at a side of the first liquid crystal layer away from the second liquid crystal layer; and
a planarization layer, located between the encapsulation layer and the first liquid crystal layer.

7. The display panel as claimed in claim 1, further comprising:
an array substrate, comprising a pixel driving circuit configured to drive pixels to emit light, wherein the pixel driving circuit and the control circuit are independent from each other and both located in the array substrate.

8. The display panel as claimed in claim 1, further comprising:
an array substrate, comprising a pixel driving circuit configured to drive pixels to emit light, wherein the pixel driving circuit comprises the control circuit.

9. The display panel as claimed in claim 1, wherein at least one of the first electrode and the second electrode is shaped of a strip.

10. The display panel as claimed in claim 9, wherein the polarizer further comprises a first alignment layer, the first alignment layer is arranged at a side of the first liquid crystal layer away from the second liquid crystal layer, an arrangement direction of the first electrode and an arrangement direction of the second electrode are parallel to a first alignment direction of the first alignment layer.

11. The display panel as claimed in claim 1, wherein at least one of the first electrode and the second electrode is in a shape of herringbone.

12. The display panel as claimed in claim 11, wherein at least one of the first electrode and the second electrode comprises a middle part in a strip shape and a plurality of extension parts extending from both sides of the middle part, and an angle is formed between each extending part and the middle part.

13. The display panel as claimed in claim 12, wherein the polarizer further comprises a first alignment layer, the first alignment layer is located at a side of the first liquid crystal layer away from the second liquid crystal layer, and an arrangement direction of each extension part is parallel to a first alignment direction of the first alignment layer.

14. The display panel as claimed in claim 1, wherein the control circuit comprises a plurality of electrode assemblies, and the first electrodes and the second electrodes of the plurality of electrode assemblies are alternately arranged.

15. A method for manufacturing the display panel according to claim 1, comprising:
- coating first liquid crystal molecules, wherein the first liquid crystal molecules are in a natural state currently;
- reducing or eliminating a polarity of the first liquid crystal molecules;
- curing the first liquid crystal molecules with the polarity reduced or eliminated to form a first liquid crystal layer to make the polarity of the first liquid crystal molecules in the first liquid crystal layer smaller than a polarity of the first liquid crystal molecules in the natural state;
- coating second liquid crystal molecules on a side of the first liquid crystal layer; and
- curing the second liquid crystal molecules to form a second liquid crystal layer.

16. The method as claimed in claim 15, wherein the reducing or eliminating a polarity of the first liquid crystal molecules comprises:
- generating a preset voltage difference between a first electrode and a second electrode in a control circuit for controlling the polarity of the first liquid crystal molecules, wherein the polarity of the first liquid crystal molecules is reduced or eliminated after the first liquid crystal molecule is under the action of the preset voltage difference for a period of time.

17. The method as claimed in claim 15, wherein before the coating first liquid crystal molecules, the method further comprises:
- forming a planarization layer on an encapsulation layer of the display panel; and
- forming a first alignment layer on the planarization layer;
- wherein the coating first liquid crystal molecules comprises:
- coating a layer of the first liquid crystal molecules on the first alignment layer.

18. The method as claimed in claim 15, wherein before the coating second liquid crystal molecules on a side of the first liquid crystal layer, the method further comprises:
- forming a second alignment layer on a side of the first liquid crystal layer by coating;
- wherein the coating second liquid crystal molecules on a side of the first liquid crystal layer comprises:
- coating a layer of second liquid crystal molecules on a side of the second alignment layer.

* * * * *